(12) United States Patent
Sheng

(10) Patent No.: US 7,920,303 B2
(45) Date of Patent: Apr. 5, 2011

(54) SCANNING DEVICE WITH MULTIPLE LED LIGHT SOURCES AND APPLICATION THEREOF

(75) Inventor: Thomas Sheng, Hsinchu (TW)

(73) Assignee: Avision Inc. (TW)

( * ) Notice: Subject to any disclaimer, the term of this patent is extended or adjusted under 35 U.S.C. 154(b) by 301 days.

(21) Appl. No.: 12/205,042

(22) Filed: Sep. 5, 2008

(65) Prior Publication Data

US 2009/0128868 A1 May 21, 2009

(30) Foreign Application Priority Data

Nov. 15, 2007 (TW) .............................. 96143159 A

(51) Int. Cl.
*H04N 1/04* (2006.01)
(52) U.S. Cl. ........ 358/475; 358/474; 358/497; 358/482; 358/483; 358/514; 358/505
(58) Field of Classification Search .................. 358/475, 358/497, 494, 474, 483, 482, 512–514, 505; 355/25; 399/362; 362/800

See application file for complete search history.

(56) References Cited

U.S. PATENT DOCUMENTS

| | | | | |
|---|---|---|---|---|
| 6,144,475 | A  * | 11/2000 | Sheng | 359/196.1 |
| 7,233,419 | B2 * | 6/2007 | Chang | 358/475 |
| 7,538,915 | B2 * | 5/2009 | Lee et al. | 358/497 |
| 2004/0218231 | A1 * | 11/2004 | Sheng et al. | 358/474 |

* cited by examiner

*Primary Examiner* — Cheukfan Lee

(57) ABSTRACT

A scanning device with multiple LED light sources and an application thereof. The scanning device includes a housing, a chassis, a main LED light source and an auxiliary LED light source. A horizontal plane of the housing is connected to a sloped plane of the housing to form a connecting section. The main LED light source has a length extending in a longitudinal direction substantially perpendicular to a moving direction of the chassis. The main LED light source provides a main light ray to illuminate the horizontal plane, and includes a first circuit board mounted on the chassis and first LEDs mounted on the first circuit board. The auxiliary LED light source includes a second circuit board mounted on the chassis and a second LED mounted on the second circuit board. The second LED provides an auxiliary light ray to illuminate the connecting section.

11 Claims, 5 Drawing Sheets

SCANNING DEVICE WITH MULTIPLE LED LIGHT SOURCES AND APPLICATION THEREOF

This application claims priority of No. 096143159 filed in Taiwan R.O.C. on Nov. 15, 2007 under 35 USC 119, the entire content of which is hereby incorporated by reference.

BACKGROUND OF THE INVENTION

1. Field of Invention

The invention relates to a scanning device with multiple LED light sources and an application thereof, and more particularly to a scanning device having main and auxiliary LED light sources to enhance the quality of scanning a book, and a multi-function peripheral and a digital copier using the scanning device.

2. Related Art

When a conventional scanner is scanning a book, a cold cathode fluorescent lamp is provided to illuminate the book. However, two ends of a linear cold cathode fluorescent lamp have the lower brightness, so the scanned results near the ridge portion of the gutter side of the book become darker. In order to solve this problem, a curved lamp may be provided for the brightness compensation. However, the curved cold cathode fluorescent lamp still has the drawbacks including the long warm-up time, the non-uniform brightness distribution and the attenuating brightness with the elapsing of time.

With the rapid development of the light-emitting diode (LED) technology, the future LED may serve as a light source for the scanner. However, a plurality of LEDs has to be packaged on a printed circuit board, and the LED light source cannot be integrally formed into a curved shape to enhance the brightness at the end portion thereof.

SUMMARY OF THE INVENTION

It is therefore an object of the invention to provide a scanning device with multiple LED light sources and an application thereof. The scanning device has main and auxiliary LED light sources for enhancing the quality of scanning a book.

To achieve the above-identified object, the invention provides a scanning device including a housing, a chassis, a main LED light source and an auxiliary LED light source. The housing has a horizontal plane and a sloped plane connected to the horizontal plane to form a connecting section. The chassis is disposed in the housing and moved along a moving direction. The main LED light source has a length extending in a longitudinal direction substantially perpendicular to the moving direction and has one end close to the connecting section. The main LED light source provides a main light ray to illuminate the horizontal plane, and includes a first circuit board mounted on the chassis, and a plurality of first LEDs mounted on the first circuit board. The auxiliary LED light source includes a second circuit board mounted on the chassis, and a second LED, mounted on the second circuit board and disposed near the one end of the main LED light source, for providing an auxiliary light ray to illuminate the connecting section.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
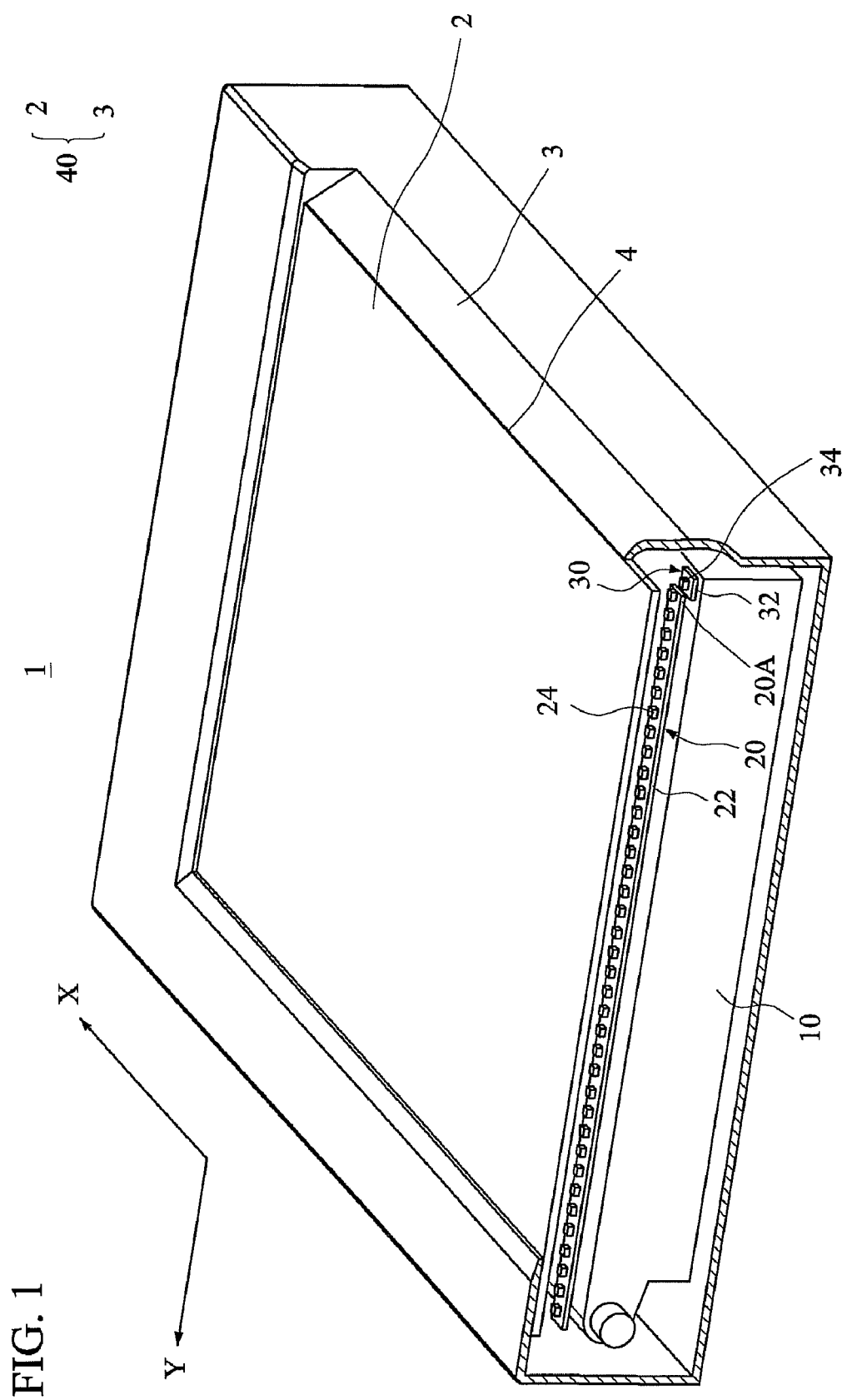
FIG. 1 is a pictorially cut-out view showing a scanning device according to a first embodiment of the invention.
Figure 2:
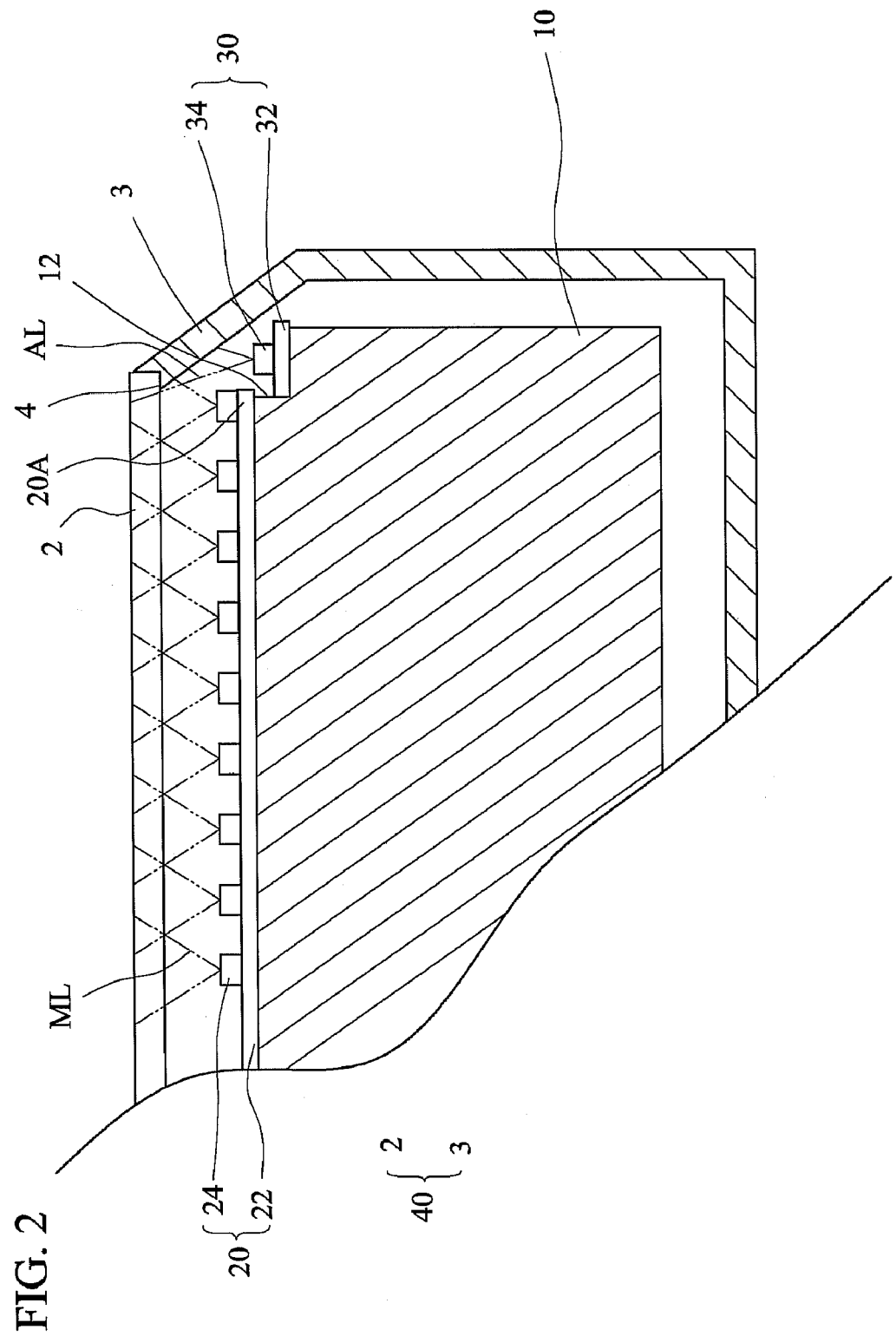
FIG. 2 is a partially cross-sectional view showing the scanning device of FIG. 1.

FIG. 1 is a pictorially cut-out view showing a scanning device 1 according to a first embodiment of the invention. FIG. 2 is a partially cross-sectional view showing the scanning device of FIG. 1. Referring to FIGS. 1 and 2, the scanning device 1 of this embodiment includes a housing 40, a chassis 10, a main LED light source 20 and an auxiliary LED light source 30. The scanning device 1 of the invention may be applied to a scanner, a multi-function peripheral or a digital copier.

The housing 40 has a horizontal plane 2 and a sloped plane 3, wherein the horizontal plane 2 is connected to the sloped plane 3 to form a connecting section 4. In this embodiment, the horizontal plane 2 represents the horizontal plane parallel to the level, while the sloped plane 3 represents the plane, which is not parallel and perpendicular to the horizontal plane.

The chassis 10 is disposed in the housing 40 and moved along a moving direction X.

The main LED light source 20 has a length extending in a longitudinal direction Y substantially perpendicular to the moving direction X. In addition, the main LED light source 20 has one end 20A close to the connecting section 4 and is for providing a main light ray ML to illuminate the horizontal plane 2. The main LED light source 20 includes a first circuit board 22 and a plurality of first LEDs 24. The first circuit board 22 is mounted on the chassis 10. The first LEDs 24 may be mounted on the first circuit board 22 and arranged in an array, in a linear manner or in other manners.

The auxiliary LED light source 30 includes a second circuit board 32 and a second LED 34. The second circuit board 32 is mounted on the chassis 10. The second LED 34, mounted on the second circuit board 32 and disposed near the one end 20A of the main LED light source 20, provides an auxiliary light ray AL to illuminate the connecting section 4.

In this embodiment, the second LED 34 is located at a level lower than a level of the first LEDs 24, and the second circuit board 32 is mounted in a concave portion 12 of the chassis 10.

In addition, the length of the main LED light source 20 is shorter than or equal to a length of the horizontal plane 2 extending in the longitudinal direction Y.

As shown in FIG. 2, the one end 20A of the main LED light source 20 is a rightmost end of the main LED light source 20, and the connecting section 4 is located on a right-hand side of the rightmost end of the main LED light source 20. Alternatively, the one end 20A of the main LED light source 20 may be a leftmost end of the main LED light source 20, and the connecting section 4 is located on a left-hand side of the leftmost end of the main LED light source 20. In order to fit with the spatial reduction caused by the sloped plane 3, the first LEDs 24 and the second LED 34 are located on different horizontal planes.

Figure 3:
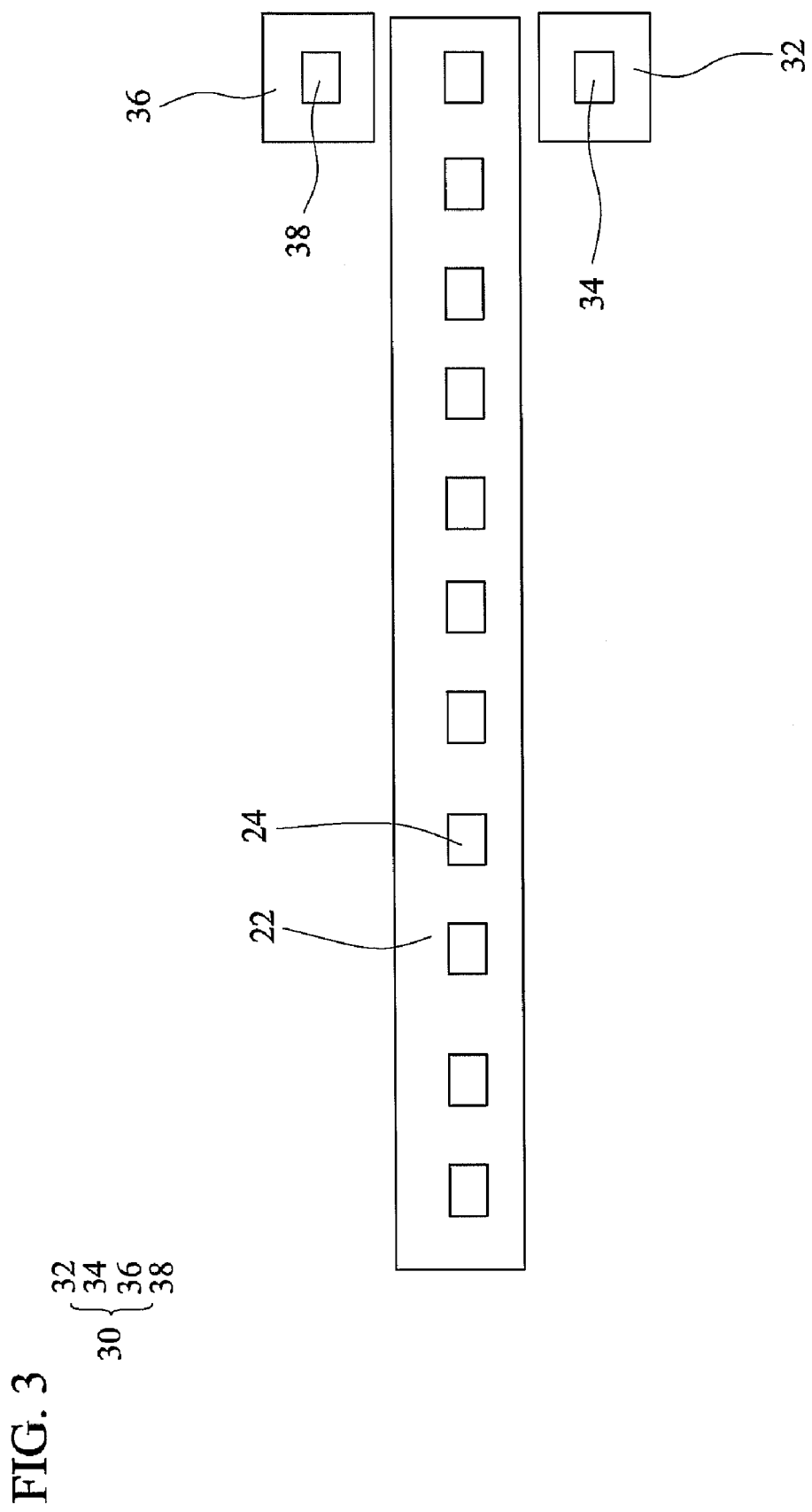
FIG. 3 shows the plane layout of main and auxiliary light sources of a scanning device according to a second embodiment of the invention.

FIG. 3 shows the plane layout of main and auxiliary light sources of a scanning device according to a second embodiment of the invention. Referring to FIG. 3, the auxiliary LED light source 30 further includes a third circuit board 36 and a third LED 38 in addition to the second circuit board 32 and the second LED 34. The third circuit board 36 is mounted on the chassis 10. The third LED 38 is mounted on the third circuit board 36, and the second circuit board 32 and the third circuit board 36 are disposed on two sides of the first circuit board 22.

In this embodiment, the LEDs 24, 34 and 38 are arranged in parallel in the moving direction X, and are disposed on the same horizontal plane. The first LEDs 24 are arranged in one line.

Figure 4:
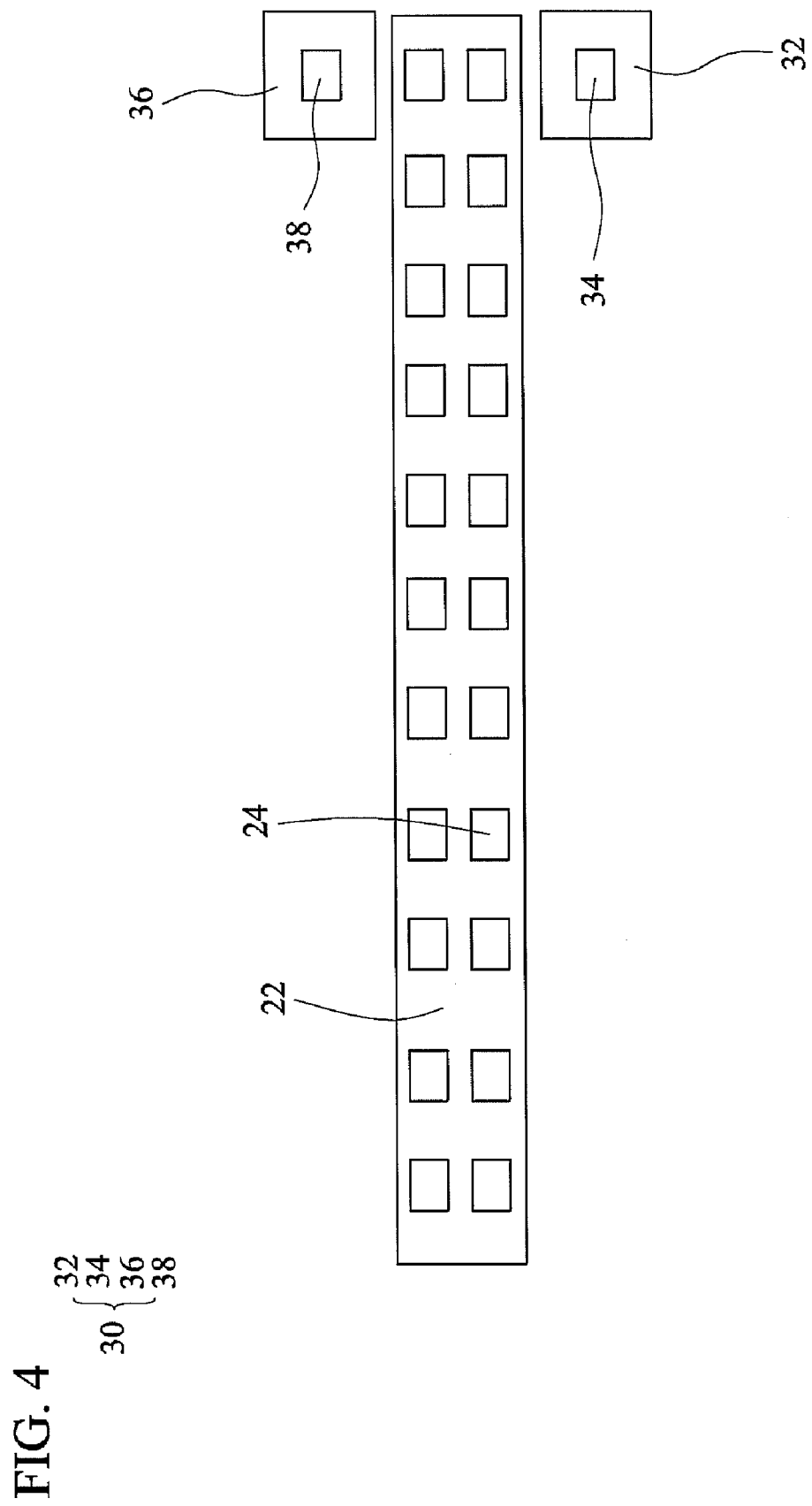
FIG. 4 shows the plane layout of main and auxiliary light sources of a scanning device according to a third embodiment of the invention.

FIG. 4 shows the plane layout of main and auxiliary light sources of a scanning device according to a third embodiment of the invention. As shown in FIG. 4, this embodiment is similar to the second embodiment except that the first LEDs 24 are arranged in two lines.

Figure 5:
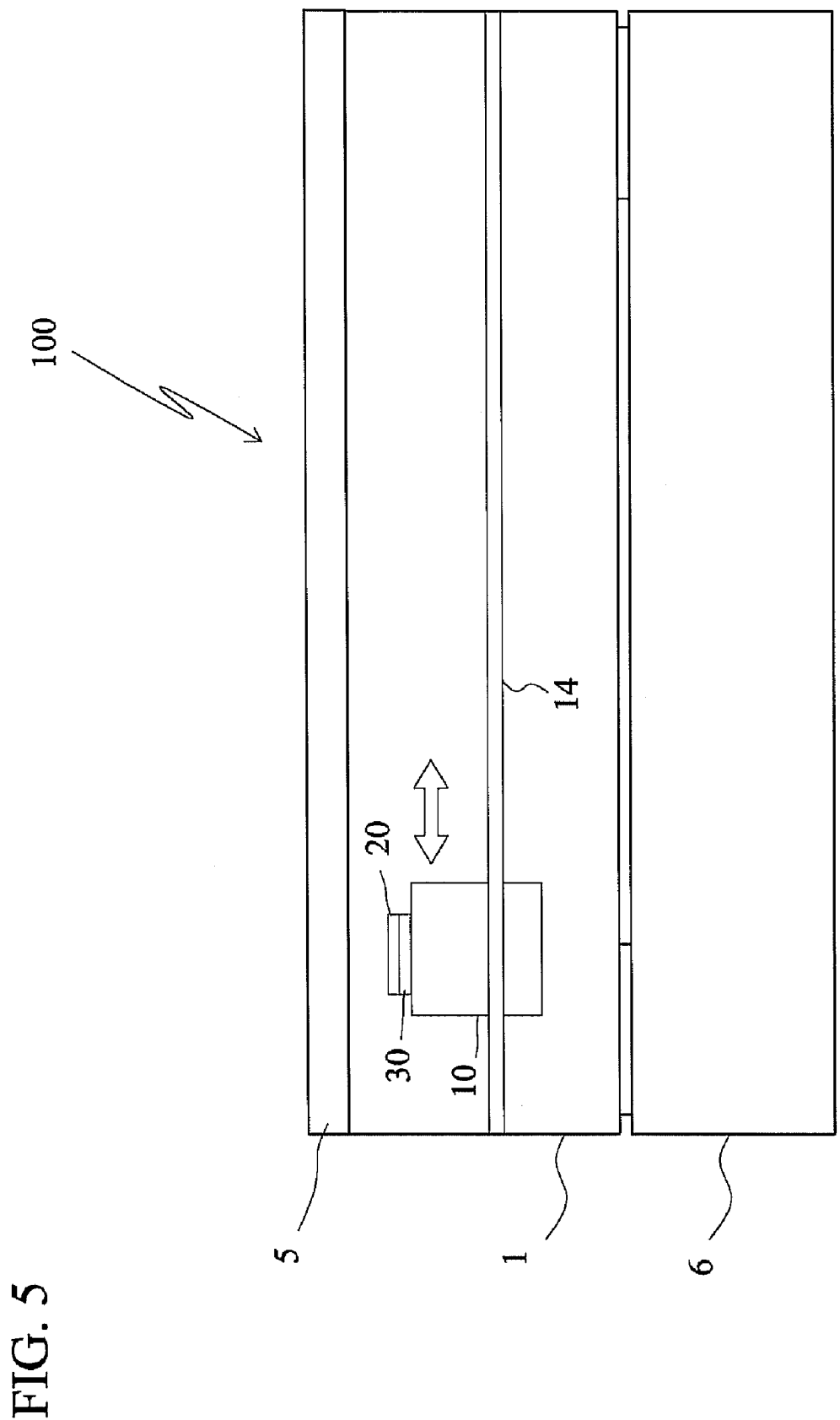
FIG. 5 is a schematic illustration showing a multi-function peripheral using the scanning device according to the invention.

FIG. 5 is a schematic illustration showing a multi-function peripheral 100 using the scanning device 1 according to the invention. As shown in FIG. 5, the multi-function peripheral 100 includes a printer 6, the scanning device 1 disposed on the printer 6, and a cover 5 pivotally connected to the scanning device 1. The chassis 10 having the main LED light source 20 and the auxiliary LED light source 30 may be moved back and forth along the guide rod 14 in the directions indicted by the arrows. The printer 6 electrically connected to the scanning device 1 receives scanned data, processes the scanned data and prints the processed data on a sheet.

In summary, the invention provides a scanning device having multiple LED light sources, wherein two sections of the LED light source are provided to compensate for the light ray at the ridge portion of the gutter side of the book so that the better scan quality can be obtained, while the LEDs are used to reduce the consumed power and the generated heat. In addition, the auxiliary LED light source and the main LED light source may be connected in parallel and controlled by different control circuits to turn on or off. Thus, when the book is scanned in a book scanning mode, the book has to rest on the sloped plane and the horizontal plane of the housing, and the auxiliary LED light source has to be lighted up for the purpose of brightness compensation. When a typical document is to be scanned in a document scanning mode, the document only has to rest on the horizontal plane of the housing, and the side edge of the document to be aligned is not the connecting section. In this scanning mode, it is unnecessary to light up the auxiliary LED light source so that more power can be saved.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A scanning device, comprising:
    a housing having a horizontal plane and a sloped plane connected to the horizontal plane to form a connecting section;
    a chassis disposed in the housing and moved along a moving direction;
    a main LED light source having a length extending in a longitudinal direction substantially perpendicular to the moving direction and having one end close to the connecting section, wherein the main LED light source provides a main light ray to illuminate the horizontal plane, and comprises:
        a first circuit board mounted on the chassis; and
        a plurality of first LEDs mounted on the first circuit board; and
    an auxiliary LED light source, comprising:
        a second circuit board mounted on the chassis; and
        a second LED, mounted on the second circuit board and disposed near the one end of the main LED light source, for providing an auxiliary light ray to illuminate the connecting section, wherein the first LEDs and the second LED are arranged in parallel in the moving direction.

2. The scanning device according to claim 1, wherein the second LED is located at a level lower than a level of the first LEDs.

3. The scanning device according to claim 2, wherein the second circuit board is mounted in a concave portion of the chassis.

4. The scanning device according to claim 1, wherein the length of the main LED light source is shorter than or equal to a length of the horizontal plane extending in the longitudinal direction.

5. The scanning device according to claim 1, wherein the one end is a rightmost end of the main LED light source, and the connecting section is located on a right-hand side of the rightmost end of the main LED light source.

6. The scanning device according to claim 1, wherein the one end is a leftmost end of the main LED light source, and the connecting section is located on a left-hand side of the leftmost end of the main LED light source.

7. The scanning device according to claim 1, wherein the first LEDs and the second LED are located on the same horizontal plane.

8. The scanning device according to claim 7, wherein the auxiliary LED light source further comprises:
    a third circuit board mounted on the chassis; and
    a third LED mounted on the third circuit board, wherein the second circuit board and the third circuit board are located on two sides of the first circuit board.

9. The scanning device according to claim 1, wherein the first LEDs are arranged in a line.

10. The scanning device according to claim 1, wherein the first LEDs are arranged in two lines.

11. A multi-function peripheral comprising the scanning device according to claim 1.

* * * * *